(12) United States Patent
Faita et al.

(10) Patent No.: US 9,806,350 B2
(45) Date of Patent: Oct. 31, 2017

(54) MEMBRANE FUEL CELL COUNTERCURRENT-FED WITH NON-HUMIDIFIED AIR

(75) Inventors: Giuseppe Faita, Novara (IT); Antonino Toro, Segrate (IT); Luca Merlo, Montorfano (IT); Zhi Yang Xue, Vienna, VA (US)

(73) Assignee: NUVERA FUEL CELLS, INC., Cambridge, MA (US)

( * ) Notice: Subject to any disclaimer, the term of this patent is extended or adjusted under 35 U.S.C. 154(b) by 1553 days.

(21) Appl. No.: 10/583,023

(22) PCT Filed: Dec. 17, 2004

(86) PCT No.: PCT/EP2004/014420
§ 371 (c)(1),
(2), (4) Date: May 9, 2007

(87) PCT Pub. No.: WO2005/060031
PCT Pub. Date: Jun. 30, 2005

(65) Prior Publication Data
US 2007/0281187 A1  Dec. 6, 2007

(30) Foreign Application Priority Data
Dec. 19, 2003 (IT) .................. MI03A2531

(51) Int. Cl.
*H01M 8/0202* (2016.01)
*H01M 8/2457* (2016.01)
(Continued)

(52) U.S. Cl.
CPC ......... *H01M 8/0202* (2013.01); *H01M 8/023* (2013.01); *H01M 8/0258* (2013.01);
(Continued)

(58) Field of Classification Search
None
See application file for complete search history.

(56) References Cited

U.S. PATENT DOCUMENTS 5,578,388 A * 11/1996 Faita et al. .................. 429/437
5,998,054 A    12/1999 Jones et al.
(Continued)

FOREIGN PATENT DOCUMENTS

| | | |
|---|---|---|
| CA | 2344377 | 3/2000 |
| JP | 08-255619 | 10/1996 |

(Continued)

OTHER PUBLICATIONS

Electrochimica Acta, vol. 43, No. 24, 1998, pp. 3795-3809.
(Continued)

*Primary Examiner* — Alix Eggerding
(74) *Attorney, Agent, or Firm* — Finnegan, Henderson, Farabow, Garrett & Dunner, L.L.P.

(57) ABSTRACT

A membrane fuel cell delimited by bipolar plates comprising a cathodic compartment and an anodic compartment, said cathodic compartment comprising means for feeding air from the bottom to the top, said anodic compartment comprising means for feeding a hydrogen-containing fuel from the top to the bottom, at least one of said cathodic and anodic compartment comprising a flow distributor consisting of a porous material and a method of operating cell said.

16 Claims, 6 Drawing Sheets

(51) Int. Cl.
*H01M 8/241* (2016.01)
*H01M 8/023* (2016.01)
*H01M 8/0258* (2016.01)
*H01M 8/0267* (2016.01)
*H01M 8/04029* (2016.01)
*H01M 8/04089* (2016.01)
*H01M 8/04119* (2016.01)
*H01M 4/86* (2006.01)
*H01M 8/04291* (2016.01)
*H01M 8/1018* (2016.01)

(52) U.S. Cl.
CPC ..... *H01M 8/0267* (2013.01); *H01M 8/04029* (2013.01); *H01M 8/04104* (2013.01); *H01M 8/04119* (2013.01); *H01M 8/241* (2013.01); *H01M 8/2457* (2016.02); *H01M 4/861* (2013.01); *H01M 8/04134* (2013.01); *H01M 8/04291* (2013.01); *H01M 2008/1095* (2013.01)

(56) References Cited

U.S. PATENT DOCUMENTS

| | | | | |
|---|---|---|---|---|
| 6,022,634 | A * | 2/2000 | Ramunni | C25B 9/04 429/210 |
| 6,040,073 | A * | 3/2000 | Okamoto | 429/437 |
| 6,627,035 | B2 * | 9/2003 | Fan et al. | 156/308.2 |
| 2001/0033956 | A1 | 10/2001 | Appleby et al. | |
| 2002/0018923 | A1 | 2/2002 | Kawahara | |
| 2002/0071981 | A1 * | 6/2002 | Sano et al. | 429/30 |
| 2003/0039875 | A1 | 2/2003 | Horiguchi et al. | |
| 2003/0129475 | A1 * | 7/2003 | Enjoji et al. | 429/38 |
| 2003/0148157 | A1 * | 8/2003 | Grasso et al. | 429/26 |
| 2003/0232231 | A1 * | 12/2003 | Stute et al. | 429/34 |
| 2004/0058206 | A1 * | 3/2004 | Erdle et al. | 429/13 |
| 2004/0191606 | A1 * | 9/2004 | Lee | H01M 8/0258 429/444 |

FOREIGN PATENT DOCUMENTS

| | | | |
|---|---|---|---|
| JP | 10-162838 | | 6/1998 |
| JP | 2002-042844 | | 2/2002 |
| JP | 2002042833 | | 2/2002 |
| JP | 2003-272666 | | 9/2003 |
| WO | WO 00/63992 | * | 4/2000 |
| WO | WO00/63992 | | 10/2000 |
| WO | WO 01/41241 | A2 | 6/2001 |
| WO | WO 02/005992 | * | 8/2002 |

OTHER PUBLICATIONS

Japanese Office Action mailed Jun. 30, 2011, from corresponding Japanese Patent Application No. 2006-544361.

Office Action mailed Jul. 4, 2011 in Canadian Patent Application No. 2,548,490.

Office Action issued by Canadian Intellectual Property Office in Canadian Patent Application No. 2548490, mailed on Jul. 11, 2016.

* cited by examiner

MEMBRANE FUEL CELL COUNTERCURRENT-FED WITH NON-HUMIDIFIED AIR

This application is a US national stage under 35 U.S.C. §371 of PCT/EP2004/014420 filed Dec. 17, 2004, which in turn claims priority to Italian application number MI2003A002531 filed 19 Dec. 2003. These applications are herein incorporated by reference.

BACKGROUND OF THE INVENTION

Fuel cells are characterised by their capacity of directly converting the chemical energy of a fuel, for example pure hydrogen or hydrogen-containing gas, to electrical energy with no intermediate combustion stage. This allows fuel cells to get rid of the constraints of Carnot's principle and therefore to have an intrinsically higher energy efficiency than the conventional generators.

Several types of fuel cells are known, among which membrane fuel cells are a solid state device with a particularly simplified internal structure and with a remarkable capacity both of providing the nominal power in a very limited time starting from zero output conditions, and of promptly responding to instant electrical energy requests. This set of characteristics makes membrane fuel cells very attractive for use in the automotive and stationary field for small power appliances, as is the case, very interesting under a commercial standpoint, of systems directed to private housing installations, hotels, telecommunication relays, as well as computing centres and hospitals as an emergency unit.

Alongside these features, membrane fuel cells present however also a few drawbacks: among these, particular relevance has the need of maintaining the proton conductive polymeric membrane in a fully hydrated state, being its conductivity precisely a function of its water content.

The membrane must be inert against the strongly aggressive action of peroxide and radical compounds which are formed as intermediate reaction products and for this reason the currently commercially available types consist of perfluorinated polymers. On the polymer chains are inserted sulphonic groups ($-SO_3H$), which must be dissociated: the resulting free electric charge in fact determines a particular spatial orientation of the polymer chains with formation of reticular channels along which the ionic migration occurs. The dissociation, which is thus a mandatory passage for channel formation, only takes place when the membrane contains a certain water amount, that is when the membrane is characterised by a suitable degree of hydration. The membrane water content is the result of a delicate equilibrium between water formed during operation and water withdrawn from the gases flowing across the fuel cell. Water extraction can become dangerously high when the fuel cell is operated at moderate pressures as required to minimise the parasite energy consumption, which negatively affect the overall system efficiency. With moderate operative pressures, in particular close to atmospheric, the volumetric gas flow-rates result to be high: on the air side, the situation is then particularly critical, since to maintain a sufficient oxygen partial pressure also in the cell regions close to the outlet, the air is supplied in a substantially higher amount, typically double, than the theoretically required value. In order to decrease the water extraction so as to preserve the necessary membrane hydration, several devices are disclosed in the prior art directed to saturate the feed gases, and especially air, with water vapour at temperatures close to that of fuel cell operation. Air saturation is achievable in the simplest of manners by bubbling the air in suitable external saturators consisting of vessels where demineralised water is maintained at the desired temperature by thermal exchange, for instance with the cooling water of the fuel cell: nevertheless, having to maintain the thermal exchange surfaces within reasonable limits, the saturator average temperature results lower than that of the cell and hence air still has a potential capability of dehydrating the membrane, which is displayed in particular at high output conditions. A modification of this device, disclosed in patent application DE 103 04 657, provides that the liquid water dragged by the exhaust air and discharged from the fuel cell be separated and collected in a vessel integrated with the cell itself: in this way it is achieved both a simplification of the overall system since the external saturator is eliminated, and a higher thermal level for the water evaporation because of the improved thermal exchange. Also with this solution, however, the temperature of saturation, although increased, remains lower than that of fuel cell operation. To complete the air feed saturation with water vapour it would be then necessary to resort to additional sources of thermal energy with a consequent decrease of the overall system energy efficiency: a procedure of this kind is claimed in U.S. Pat. No. 6,350,535, wherein atomised liquid water is added to the air feed and the mixture so obtained is directed across a heat exchanger provided with the required thermal energy to evaporate the water. These devices in any case require level control instrumentation, pumps for water feeding, purge flow-rate control to prevent the build-up of impurities inevitably present, albeit as traces, in the water to evaporate, with sensible consequences on the total costs. In U.S. Pat. No. 6,066,408 a method of humidification is described comprising humidifying cells intercalated to the fuel cells of a stack: in this way the humidifying cells practically operate as cooling cells wherein the cooling is ensured by the evaporation of the water required to saturate the air which is made flow across them. The humidification temperature results higher than that obtained with the above discussed external saturators, but always lower than that of the fuel cells since some temperature difference is still required to maintain an adequate heat exchange rate. However, such a device is hardly efficient in the start-up phase and at low power output when the cell temperature is significantly lower than at regime operation.

In US 2001/10015501 the use of a apparatus commonly defined as enthalpic unit is disclosed. Such unit consists of a vessel divided into two compartments by a selective water-permeable membrane: the two compartments are respectively fed with air at ambient temperature to be directed to the stack and with water vapour-saturated warm exhaust air exiting the cells. A heat and water exchange takes place across the membrane from the exhaust to the air feed, which warms up and is humidified: also in this case, however, the final temperature of the air feed is certainly lower than the operating temperature of the fuel cells. A similar device is disclosed in DE 199 18 849 wherein the water and heat transfer does not take place across a selective membrane, but rather through the use of a rotating drum subdivided into sectors whose internal walls are provided with a film of hygroscopic material, for instance a lithium salt. The rotation of the drum puts each sector subsequently in communication first with the exhaust air which transfers its water content to the hygroscopic material, then with the dry air feed which warms up and extracts water from the hygroscopic material. Of course, this device is as well subject to the previously mentioned limitations.

In U.S. Pat. No. 5,441,821 a certain moisture and thermal level is achieved through the recycle of exhaust air on the air feed fan or compressor: in this case, supposing that the exhaust air is saturated with water vapour, the resulting humidity of the overall air stream is a function of the ratio between the flow-rates of the recycle and of the fresh air from the environment. Since this ratio cannot be very large in order to contain the size of fans or compressors and the relevant energy consumption within reasonable limits, the overall air humidity content is again unsatisfactory. Furthermore the recycle of oxygen-depleted exhaust air implies the average partial pressure of oxygen inside the fuel cells to be lower than that characterising the operation without recycle. This may imply a certain lessening of the performances.

To obviate to the above inconveniences while achieving a safe and complete membrane hydration, U.S. Pat. No. 6,406,807 discloses the direct injection of water inside the fuel cells: the evaporation effectively withdraws the reaction heat simultaneously generating the vapour partial pressure required for maintaining a correct hydration of the membranes. The method is somehow critical in consideration of the fact that the amount of water has to be calibrated as a function of power output to prevent the two opposed hazards of hydration loss (injection of an insufficient amount of water) and of electrode flooding (injection of an excessive amount of water).

A further way of facing the problem of membrane dehydration is discussed in US 2002/0068214: besides the humidification carried out by means of one of the above disclosed processes, the membrane fuel cell cathode has a reduced porosity in the air inlet region, which is more exposed to the risk of excessive water evaporation. In this way the water withdrawal as vapour or even as liquid results to be the more hindered the lower is the residual porosity, with a better preservation of the membrane hydration. This procedure entails two serious inconveniences, one associated with the simultaneous decrease of oxygen diffusion rate leading to performance drop, and the other with the more complex electrode structure, badly fitting the requirements of large scale and low cost production.

The above types or air feed conditioning, due to their intrinsic limitations, are acceptable only in case of high pressure operation, typically from 3 to 4 bar, that is when the air feed has a substantially reduced volumetric flow-rate and may have a temperature higher than ambient under the effect of compression, while they are arguable and poorly reliable for operation at pressure below 3 bar, in particular below 2.5 bar.

The basic aim of the present invention is to overcome the limitations of the prior art by disclosing a fuel cell which can be operated with non-externally humidified air also at moderate pressures.

DESCRIPTION OF THE INVENTION

According to a first preferred embodiment the membrane fuel cell is equipped with vertically disposed bipolar plates, internal gas feed flow distributors, catalytic anode and cathode, proton-conducting membrane and cooling device, said internal distributors consisting of porous planar elements optionally provided with residual deformability and elasticity, such as three-dimensionally reticulated materials, sintered materials, juxtaposed meshes or expanded sheets, in which the gas feed with flow-rate adjusted as a function of the electrical current output is comprised of non-externally humidified air introduced at the bottom of the cell and of hydrogen or hydrogen-containing gas, optionally saturated with water vapour, introduced from the top of the cell (counter-current gas flows), wherein the pressure of the outlet air is lower than 3 bar, preferably lower than 2.5 bar and even more preferably close to atmospheric pressure, in which case the air pressure drop across the relevant flow distributor is lower than 1 bar and typically equal to 0.5 bar in the operating conditions corresponding to the maximum nominal current output.

According to a second preferred embodiment, air is fed at a pressure lower than 3 bar, the pressure drop across the relevant flow-distributor is negligible and the temperature of air discharged from the cell is kept close to but below the dew point, corresponding to the water vapour partial pressure which is a function of the ratio of moles of product water to moles of discharged air and vapour.

According to a third preferred embodiment of the invention, liquid water is injected at the bottom of the cell (in correspondence of the air inlet at a pressure lower than 3 bar), its flow-rate being adjusted as a function of the electrical current output.

According to a fourth preferred embodiment of the invention, liquid water is injected at the cell bottom and the flow-rates of air fed at a pressure lower than 3 bar and of injected water, adjusted to the value required for maximum nominal output, are kept constant under the whole range of electrical current.

BRIEF DESCRIPTION OF THE DRAWINGS

The invention will be explained hereafter making reference to the following figures, having a merely exemplifying purpose.

DETAILED DESCRIPTION OF THE DRAWINGS

During the operation of a fuel cell, be it single or assembled in a stack of multiple cells, the region of membrane more exposed to the risk of dehydration is the one immediately adjacent to the gas inlet, and in particular to the air inlet whereto specific reference will be made hereafter. This region, in fact, is subject to a quick evaporation of the product water, which is generated by the reaction between the air, the protons migrating across the membrane and the electrons flowing through the external circuit. If the rate of evaporation is higher than that of water formation, the membrane undergoes a progressive dehydration hindering proton migration with a consequent downfall in conductivity and performances. It is to be noted that if the situation of dehydration or poor hydration persists in time, the polymer structure is subject to a slow structural reorganising process which makes the conductivity loss to be permanent. Moreover, in conditions of severe dehydration, the mechanical characteristics of the membrane and in particular its plastic reserve sharply decay, increasing the hazard of developing intolerable defects such as porosities or microfractures, especially localised in the zones of higher mechanical strain, such as for example the edges and the possible irregularities in the electrode surfaces.

To prevent these problems, the prior art is substantially directed either to ensure the prehumidification of the air feed initially containing just the ambient humidity (hereafter defined as dry air), which being nevertheless incomplete for the above mentioned reasons only softens the dehydration hazards without eliminating the same, and/or to employ electrodes provided with a lower porosity in the gas inlet region, capable of hindering the diffusion of the product water better preserving the membrane hydration, but at the cost of a performance lessening and of non negligible complications in the manufacturing phase. In the central and terminal regions on the exhaust air outlet side, the progress of the reaction determines the formation of increasing amounts of water which, once having saturated the air, are separated in the liquid phase: membrane hydration is clearly maximum in these regions, but the presence of water droplets entails difficulties in the distribution of air when the internal distributors consist of planar elements whose surface is provided with a multiplicity of grooves fed in parallel with air. The presence of water droplets stuck inside some of the grooves as a matter of fact prevents the passage of air and therefore the correspondent electrode portions are inactivated, with an overall drop in the cell performances. The problem is attenuated by adopting groove passage sections producing a sufficient pressure drop to completely remove the droplets. Such a solution, implying a higher energy consumption for the necessary pressurisation of air, loses effectiveness at the low air flow-rates corresponding to the conditions of reduced or zero electrical output. The complete expulsion of liquid water from the cell is furthermore very difficult and invariably forces to feed the air from the top of the cell so as to couple the effect of gravity to the drag exerted by the exhaust air exiting at the bottom.

Figure 1:
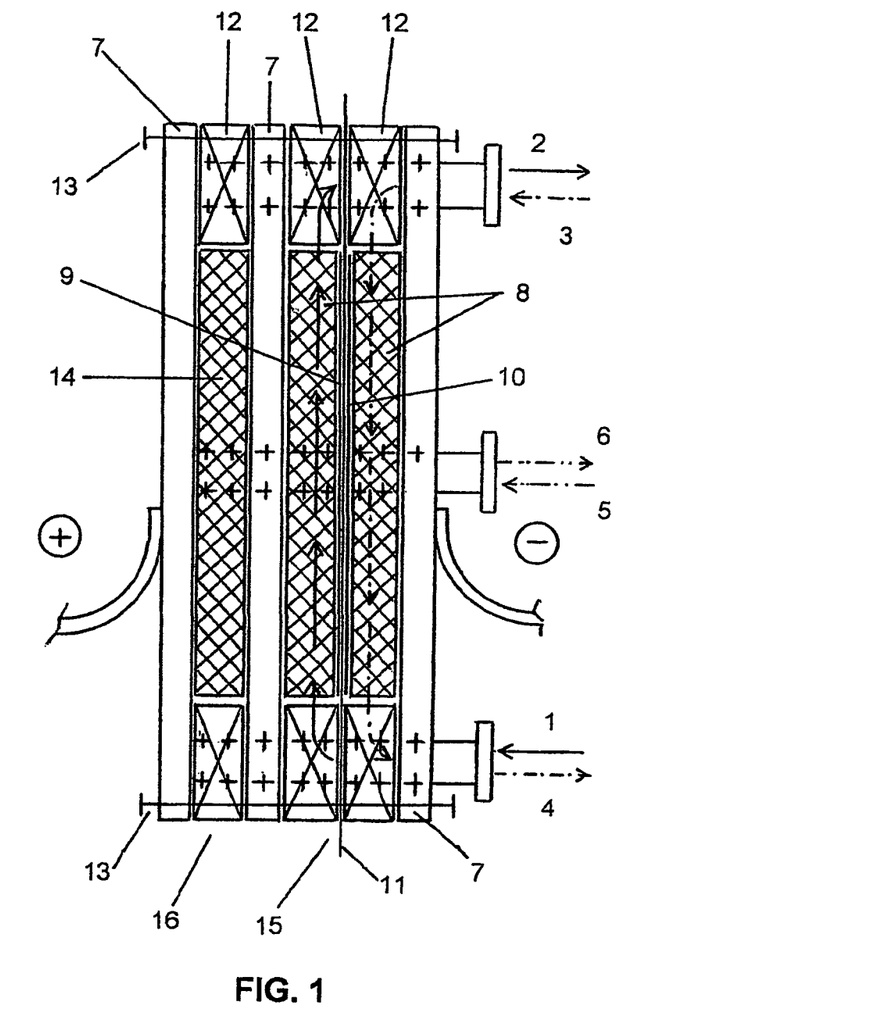
FIG. 1, showing a cross-section of the membrane fuel cell according to the invention also indicating the directions of the gas flows.
Figure 2:
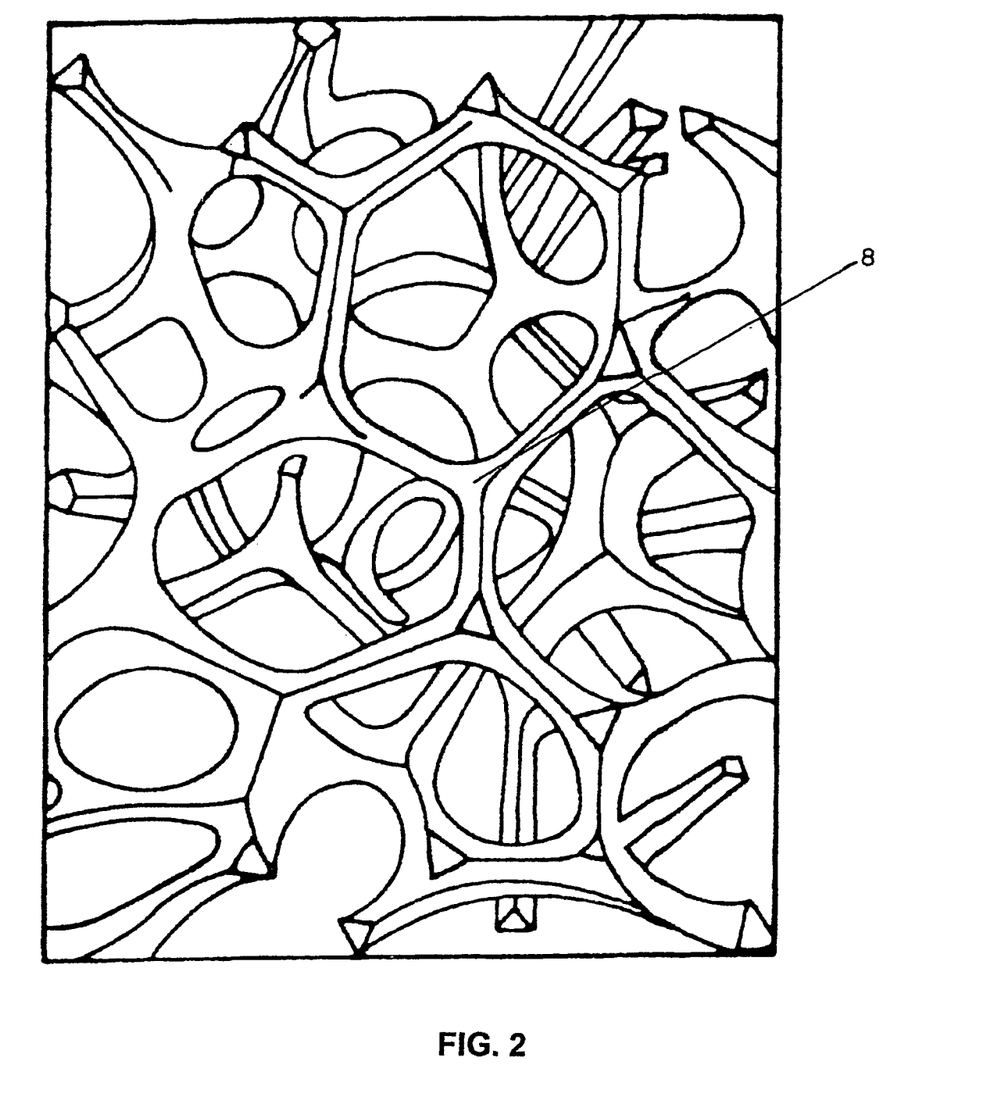
FIG. 2, showing in detail an embodiment of the internal gas feed flow distributor consisting of three-dimensionally reticulated material.
Figure 3:
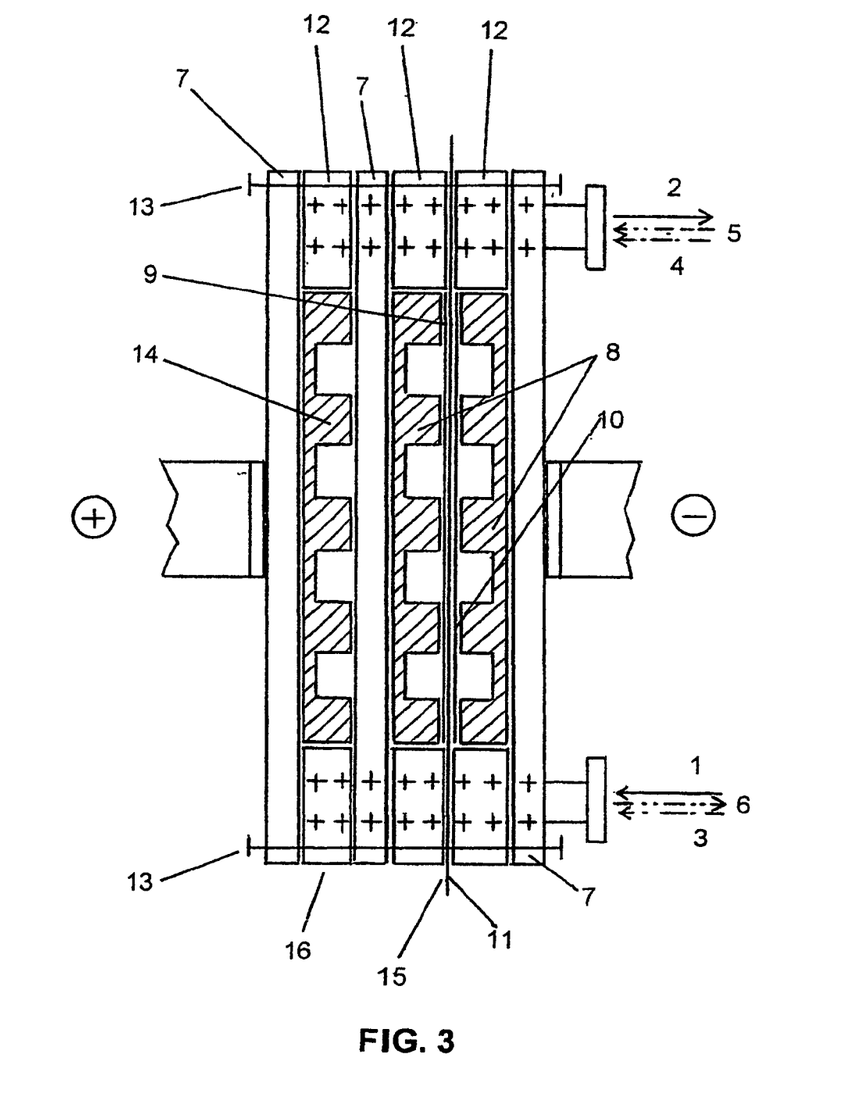
FIG. 3, showing a cross-section of an embodiment of membrane fuel cell according to the prior art.
Figure 4:
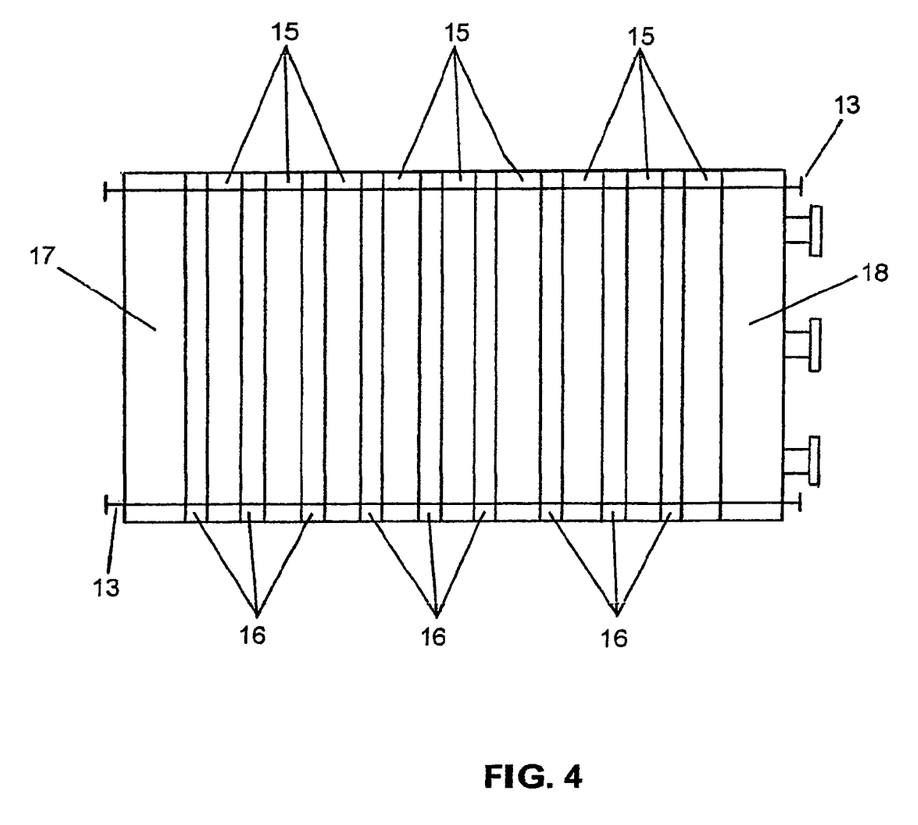
FIG. 4, showing a multiplicity of membrane fuel cells according to the invention laminated in a stack capable of generating high voltage electrical current as normally required by the electrical appliances.

The inventors, on the basis of a wide testing, surprisingly found that it is possible to operate a fuel cell in a stable fashion over a wide range of current densities as requested by practical applications, with voltages corresponding to good energy conversion efficiencies and with stoichiometric excesses equivalent to those of common use in the prior art also at moderate pressures, in particular below 3 bar, and more particularly at near-atmospheric pressures and with no prehumidification of the air feed. Such a result of great practical interest is made possible by the simultaneous adoption of internal gas distributors consisting of planar porous elements, for instance three-dimensional reticulated materials, sintered materials, juxtaposed meshes as described in U.S. Pat. No. 5,578,388, while feeding dry air from the cell bottom. The three-dimensional reticulated material is shown in FIG. 2: the material is obtained out of an open-cell polymer foam reinforced with a metallic coating, for instance nickel or nickel-chromium alloy, the latter being preferred due to its enhanced corrosion resistance. Alternatively, the polymer foam is reinforced with a resin coating containing a conductive charge, for instance in form of graphite particles. By adjusting the coating thickness and adequately selecting the constituting materials it is possible to obtain a reticulated material with suitable compression resistance and endowed with residual elasticity, as required in order to ensure the best electrical contact between bipolar plates and electrodes. The internal distributor in form of porous planar element has the advantage, in comparison to the type consisting of a grooved planar element, of accepting the presence of water droplets without introducing sensible inhomogeneties in the distribution of gas, in particular of air. Moreover if the ratio of void internal volume to total volume of the porous element is high, typically above 50%, the gas passage velocity is reduced and therefore it is likewise reduced also the dragging effect of the water droplets, which can now percolate at least partially under the effect of gravity to the cell bottom, where they facilitate the humidifying process of the dry air feed and maintain an optimal membrane hydration just in the region of higher criticality. It is clear to one skilled in the art that a similar effect could not be attained with the internal distributors of the grooved type since the conflicting effect between the drag of the upward air flow inside the grooves and the force of gravity acting downwards would increase the population of water droplets in the grooves with an unacceptable worsening of the gas distribution. FIG. 1 shows a cross-section of the fuel cell according to the invention, wherein (15) indicates the fuel cell, (16) the cooling device, (1) and (2) respectively the dry air inlet and the exhaust air outlet, (3) and (4) the inlet and outlet of the pure hydrogen or hydrogen-containing gas, (5) and (6) the cooling water inlet and outlet, (7) the bipolar plates made of conductive material, for instance graphite or polymer-graphite composites or metallic alloys such as stainless steel, (8) the gas internal distributors of the cell consisting of porous planar elements, for example manufactured out of the three-dimensional reticulated material of FIG. 2, (9) the cathode, that is the catalysed electrode fed with air, (10) the anode, that is the catalysed electrode fed with hydrogen or hydrogen-containing gas, (11) the proton-conducting membrane, (12) the sealing gasket frames provided, as the bipolar plates, with appropriate holes suitable to form by juxtaposition the longitudinal manifolds for the passage of the gases and the cooling water (identified by the lines with crosses), (13) the tie-rods necessary to keep the assembly under compression in order to achieve the peripheral sealing of the gases to the external environment and the electrical contact between bipolar plates, distributors and electrodes, (14) a porous element equivalent to elements (8) suited to guarantee the uniform distribution of the cooling water and to establish the electrical continuity between cathode (9) of the cell and external contact (+). The flows of the two gases, the upward one of air and the downward one of fuel, are represented respectively by the continuous and by the dotted line. For a better comprehension of the invention FIG. 3 shows a section of a top-view of a fuel cell according to the prior art, wherein the equivalent components with respect to the cell of the previous drawings are identified by the same reference numerals. As it can be noticed the internal distributors (8) consist of planar elements free of porosity and provided with vertical grooves. The grooved distributors normally constitute a whole with the bipolar plates. In FIG. 3 are also indicated the feed and discharge flows of air (1) and (2) and of fuel (3) and (4) which are both directed from the upper to the lower part of the cell (cocurrent flows). FIG. 4 shows how a multiplicity of cells according to the invention can be assembled to form a stack comprising, besides the various cells, also two terminal plates (17) and (18) whose stiffness ensures a uniform compression of all the components in the longitudinal direction. The lines with crosses indicate the manifolds for the passage of the gas feeds, the discharges gases and the cooling water and which are formed by the juxtaposition of the appropriate holes present on the bipolar plates and on the gasket frames, as known in the art.

EXAMPLE

Figure 5:
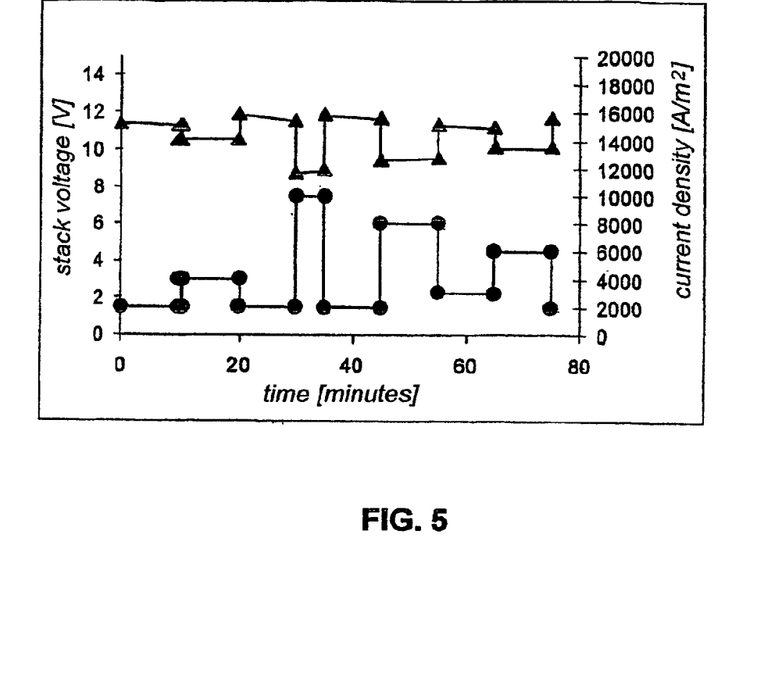
FIG. 5, reporting a diagram of the operating cycle relative to a 15 membrane fuel cell stack fed with non-prehumidified air.
Figure 6:
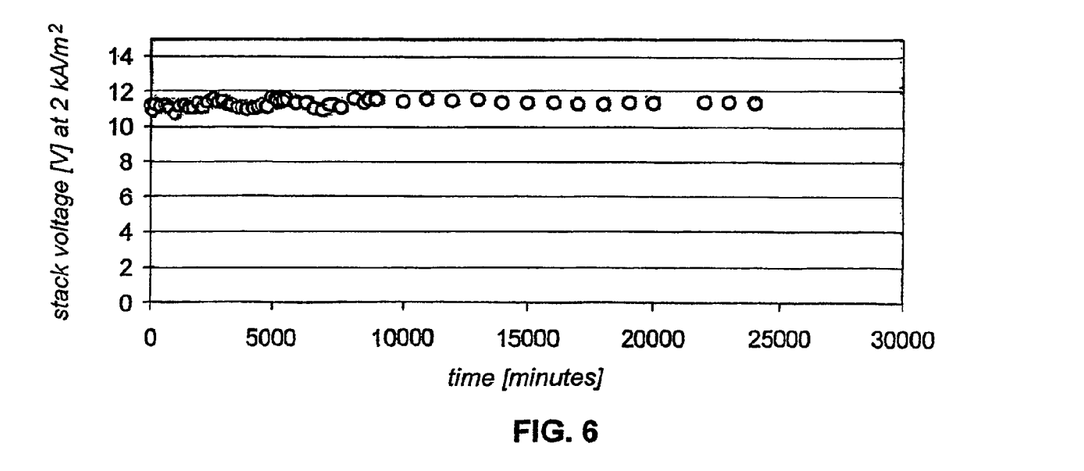
FIG. 6, showing the voltage stability of the stack of FIG. 5, taken at different times at a current-density of 2000 A/m$^2$.

The invention was tested in three different embodiments: the first embodiment intends to take advantage from the mentioned capacity of the porous-type element to uniformly distribute the gases, air in particular, also in the presence of water droplets stuck inside the structure, however in operating conditions minimising the probability of percolation of liquid water toward the lower part of the cell. In this situation, the hydration of the membrane in the lower region where air is fed is ensured by the diffusion of liquid water from the anodic compartment across the membrane. The formation of liquid water in the anodic compartment is made possible by the relevant flow-rate contraction undergone by pure hydrogen and to a significant extent also by the hydrogen-containing gas: such contraction determines the supersaturation of the water vapour whereof hydrogen has been enriched in the transit across the cell or which was already present in the fed hydrogen-containing gas. It follows that liquid water separates in the lower part of the cell succeeding in maintaining the membrane hydrated also when dry air is injected on the opposite side. Nevertheless, since the amount of water which condenses on the anode side is relatively modest, it is necessary that the air volumetric flow-rate be limited, particularly in conditions of maximum electrical output when the quantity of air required for the regular functioning is certainly remarkable. For this condition to be met it is necessary that the air pressure in correspondence of the cell inlet region be higher than atmospheric, but lower than 3 bar, preferably lower than 2.5 bar, to limit the energy consumption of the compressor, as previously said. The reduced volumetric flow-rate, if on one hand is favourable for maintaining the hydration in the critical region of the membrane, results however counterproductive since the water vapour saturation is rapidly reached. Hence, already partially in the central region and especially in the region close to the exhaust air outlet, a sensible amount of liquid water is formed, which may negatively affect the behaviour even of a tolerant component as is the porous planar element. This problem can be solved by selecting a planar element whose porosity establishes a sensible pressure drop on the air flow. The pressure drop implies the increase of the air volumetric flow-rate with consequent enhanced capacity of vaporising liquid water. The capacity of vaporising water in the liquid phase may be further influenced through the exhaust air temperature, in its turn being a function of the cooling water temperature. FIG. 5 shows the voltages of a 15 cell stack subjected to a severe electrical output cycle from 2000 $A/m^2$ to 10000 $A/m^2$. In FIG. 6 the trend in time of the voltage at 2000 $A/m^2$ is reported. The cells of the stack were comprised of AISI 316 L-type stainless steel bipolar plates, internal gas distributors of nickel-chromium alloy three-dimensional reticulated type, ELAT® electrodes provided by De Nora North America, E-Tek Division, USA, Nafion® N1135 membranes provided by DuPont, USA. The operating conditions were: dry air fed in the lower part of the cells at 1.5 bar at 25-50° C., exhaust air discharged from the upper part of the cells at near-atmospheric pressure (pressure variation in crossing the porous planar element: about 0.5 bar), air stoichiometric excess equal to 1.7-2.4, hydrogen fed in the upper part of cells at 1.3 bar, hydrogen stoichiometric excess equal to 1.1-1.2, operating temperature 65-75° C., inlet and outlet cooling water temperature respectively 62° C. and 74° C. As it can be noticed from the diagram in FIG. 6, the stack operation results extremely stable notwithstanding the dry air feed and the very severe operating conditions. For the sake of comparison a stack entirely identical to the one of FIGS. 5 and 6 was operated at the same operating conditions, the only difference being in the dry air feed effected from the top of the cells: a progressive performance decay was observed with a sharp voltage drop of a few cells to values close to those of destructive inversion after about 350 hours of operation. Also for the sake of comparison a stack equivalent to that of FIGS. 5 and 6 was operated, the difference being in the type of internal distributor which consisted of grooved planar elements of the type illustrated in FIG. 3. The voltage downfall that had occurred with the dry air feed from the top of the cells was not observed, nevertheless the voltage values resulted on average 0.1 volt per cell lower than those of FIGS. 5 and 6, and highly unstable with oscillations even of 0.2 volt per cell, as a clear demonstration of a time-variable inhomogeneity in the air distribution, most likely provoked by the presence of liquid water droplets periodically trapped in the grooves of the internal distributors.

The pressure variation associated with the crossing of the porous internal distributor by air and which allows, as seen, to keep under control the liquid water formation inside the cell, implies a higher mechanical strain on the membrane particularly along the perimeter: for this reason it is necessary to completely support the membrane along the periphery and to prevent asperities or other types of irregularities in this delicate zone.

The second embodiment of the invention addresses this problem ensuring a practically uniform pressure distribution on the membrane, also with modest cathode-anode pressure differentials. For this purpose the porous internal distributor is characterised by high void volume to total volume ratio, for instance above 50%, and preferably above 70%: as a consequence, the air pressure drop across the distributor is extremely reduced, indicatively below 0.2 bar, more preferably below 0.1 bar. In these conditions, operating at a particularly moderate pressure, typically below 2 bar and preferably at near-atmospheric pressure, the air volumetric flow-rate, as previously mentioned, is high and capable of dehydrating the membrane in the feed region where the available water is only that which diffuses across the membrane from the anodic compartment. This problem may be kept under control by fixing the exhaust air temperature marginally below the dew point which is a function of the ratio moles of water formed by reaction/total discharged moles of exhaust air and vapour, through the regulation of the cooling water temperature: in this way a fraction of the water formed by reaction condenses and percolates through the porous distributor to the bottom of the cell, where it keeps the membrane hydrated. For the sake of verifying the process efficiency, the stack in accordance with the invention was operated with the settings employed for obtaining the data of FIGS. 5 and 6, the differences being the distributors consisting of nickel-chromium alloy three-dimensionally reticulated material with a void volume/total volume ratio of 75%, the feed pressure of 1.2 bar and the exhaust air outlet temperature kept around 60-65° C. The results obtained were fully satisfactory, with a substantial stack voltage stability also after 560 hours of operation with voltages equivalent to those indicated in FIGS. 5 and 6. The described operation requires some control instrumentation of the exhaust air outlet temperature and of the cooling water temperature.

Figure 7:
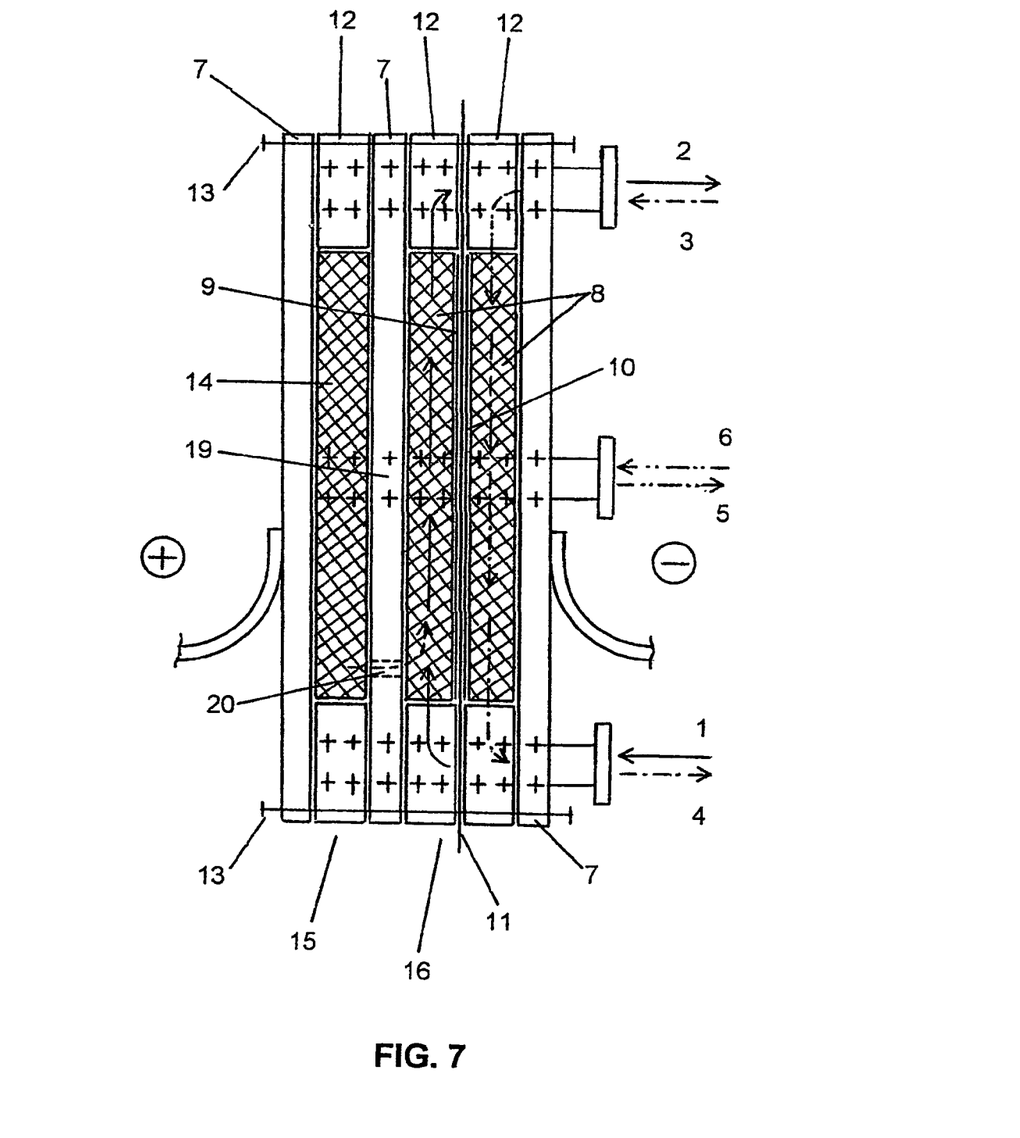
FIG. 7, sketching the crossection of a membrane fuel cell according to the invention with water injection at the bottom, on the air feed side.

The third embodiment of the invention ensures the membrane hydration in the lower critical region in conditions of dry air feed at moderate pressure, lower than 3 bar, preferably lower than 2.5 bar and even more preferably at near-atmospheric pressure by means of the direct water injection as sketched in FIG. 7: the bipolar plate (19) facing the cathode (9) is provided with calibrated holes (20) through which the water fed at (16) is injected into the cathodic compartment (dotted line) in the proximity of the dry air feed. Since the injected water, besides keeping the membrane hydrated, evaporates to humidify the air, it also guarantees an effective cooling making the cooling water circulation through (16) not necessary anymore. The flow of injected water is established in a simple fashion by means of an adjustable rotating external pump (not shown in FIG. 7). The exhaust air outlet temperature does not require any particular adjustment and may certainly result higher than the dew point as above defined. The stack of the invention, consisting of 15 cells modified as indicated to adapt them to the humidifying water injection, was operated in the electrical output conditions used for obtaining the data of FIGS. 5 and 6, with a very satisfactory voltage stability and slightly better voltages than those collected in FIGS. 5 and 6. It can be supposed, without thereby limiting the invention at all, that the effectiveness of the injected water is due to the formation of a small liquid phase level in the lower part of the cells. This level fully hydrates the membranes and quickly humidifies the air, which is forced to bubble through it. The water-flow rate is adjusted as a function of the electrical output by acting on the rotation regime of the injection pump so as to obtain an equilibrium condition between amount injected and amount withdrawn in form of vaporized water and of dragged water as atomised phase.

An operating alternative to this third embodiment of the invention is characterised by a remarkable simplification of the regulations and contemplates that the fuel cell or stack, in the case of a multiplicity of cells, be provided with air feed and water injection fixed at the required value for the maximum nominal electrical output conditions: thus the lower is the electrical output, the larger are the excesses of air and water. In the case of the current technology, a situation of this kind would rapidly lead to the drying out of the membrane with performance collapse, while in the case of the invention the dehydrating effect of the high air flow-rates is effectively counteracted by the injection of water even in the critical air inlet region and even in conditions of reduced or nil formation of product water as occurs at low or zero electrical output. Of course this kind of operation entails a higher average energy consumption for feeding the air, which can be however within acceptable limits depending on the air feeding pressure that can be particularly moderate, typically 1.2 bar, and preferably 1.1 bar: for example, in the case of a 5 kW electrical power stack, the dry air flow-rate with a stoichiometric excess of 2 results to be about 16 $m^3$/hour, corresponding to an indicative power of just 0.25 kW for bringing the pressure to 1.2 bar. The stack of the invention, operated as indicated, showed excellent performances, with a system simplicity and therefore with an operative reliability inconceivable up to now.

The invention in its broader aspects is not limited to the disclosure given in the present specification and, accordingly, various modifications may be devised without departing from the scope of the invention as defined in the appended claims.

In the description and claims of the present application, the word "comprise" and its variations such as "comprising" and "comprises" are not directed to exclude the presence of other elements or further components.

The invention claimed is:

1. A membrane fuel cell delimited by bipolar plates comprising:
    an anode, a cathode, and a polymeric membrane interposed between the anode and the cathode,
    a cathodic compartment disposed between a first bipolar plate and the cathode, and
    an anodic compartment disposed between a second bipolar plate and the anode, wherein
    said cathodic compartment comprising a flowfield and a dry air inlet disposed about the bottom of the cathodic compartment through which dry air enters the cathodic compartment, and an exhaust air outlet disposed about the top of the cathodic compartment through which exhaust air is discharged from the cathodic compartment,
    said anodic compartment comprising a flowfield and a hydrogen-containing fuel inlet disposed about the top of the anodic compartment through which a hydrogen-containing fuel enters the anodic compartment, and an anodic exhaust outlet disposed about the bottom of the anodic compartment through which anodic exhaust is discharged from the anodic compartment,
    at least one of said cathodic and anodic compartment comprises a porous material providing an open flowfield,
    wherein flow of dry air from the bottom of the cathodic compartment to the top of the cathodic compartment through the flowfield therein is countercurrent to flow of hydrogen-containing fuel from the top of the anodic compartment to the bottom of the anodic compartment through the flowfield therein,
    wherein the porous material is in form of a porous planar element, the porous planar element consisting of a three-dimensional, reticulated, open-cell, metallic foam,
    and wherein the porous material has a porosity dimensioned with a void volume/total volume ratio equal to or higher than 75% such that the generated gaseous flow pressure variation is between 0.1 and 0.5 bar.

2. The cell of claim 1 wherein said at least one compartment comprising a porous material is the cathodic compartment.

3. The cell of claim 1 wherein said porous material has a porosity dimensioned for generating a gaseous flow pressure variation not higher than 0.1 bar.

4. The cell of claim 1 comprising a heat extraction device crossed by liquid water in communication with said cathodic compartment through calibrated holes on the relevant bipolar plate delimiting the cell.

5. A fuel cell stack comprising a multiplicity of cells of claim 1.

6. A method for operating the cell of claim 1 or the stack of claim 5 comprising feeding said cathodic compartment with air in a dry state and at a pressure lower than 3 bar.

7. The method of claim 6 wherein said pressure is lower than 1.2 bar.

8. The method of claim 6 wherein the temperature of the air discharged from the upper part of said cathodic compartment is less than or equal to the dew point defined by the ratio of moles of water of reaction/overall moles of discharged air and water vapor.

9. The method of claim 8 wherein the regulation of said temperature of discharged air is obtained by adjusting the temperature of a cooling fluid circulating inside the cell.

10. The method of claim 9 wherein said cooling fluid is water injected in the lower part of the cell in the proximity of air feed.

11. The method of claim 10 wherein said water is injected in the lower part of the cell through calibrated holes present on the bipolar plate facing said cathodic compartment.

12. The method of claim 11 wherein said calibrated holes are in communication with a heat extracting device whence said water injected in the lower part of the cell proceeds.

13. The method of claim 12 wherein the flow-rate of the water flowing in said extracting device is substantially equivalent to the flow-rate of said water injected through said calibrated holes.

14. The method of claim 10 wherein the regulation of the flow-rate of said injected water is carried out as a function of the electrical current output.

15. The method of claim 14 wherein said regulation is achieved by acting on the operating regime of an injection pump.

16. The method of claim 10 wherein said injected water and said air feed have a constant flow corresponding to the value required for the maximum nominal electrical output.

* * * * *